ELECTRICAL PULSE PRODUCING APPARATUS

Filed Dec. 9, 1957

INVENTOR.
SADIA S. GUTERMAN
BY Henry L. Hanson
ATTORNEY

1

2,959,686

ELECTRICAL PULSE PRODUCING APPARATUS

Sadia S. Guterman, Dorchester, Mass., assignor to Minneapolis-Honeywell Regulator Company, Minneapolis, Minn., a corporation of Delaware Filed Dec. 9, 1957, Ser. No. 701,660

11 Claims. (Cl. 307—88)

A general object of the present invention is to provide a novel electrical pulse producing circuit. More specifically, the present invention is concerned with a new and improved pulse producing circuit utilizing a bistable magnetic core in combination with electronic circuitry wherein the combination is operationally characterized by its sensitivity, its signal discriminating ability, and its low power consumption.

The present invention utilizes a square hysteresis loop magnetic core in combination with suitable input and output circuitry to provide a highly sensitive pulse amplifier which may be readily gated by an input gating signal. This circuit is particularly adapted for use as a signal discriminator, such as may be used with input devices having transient signals thereon or other signals which may not be wanted. When a desired signal of the requisite amplitude is applied to the input, the output will be a pulse of uniform dimension regardless of the character of the input signal. These features render the apparatus particularly useful in circuitry handling digital information. A typical source of signals for a circuit of the present type may be, for example, a read amplifier associated with a magnetic record sensing device, or a sense amplifier connected to the output of a digital memory circuit. Because of the sensitive switching characteristics of the present circuitry, it is further useful in a circuit of the analog to digital conversion type for the reason that a ramp function input, as from an analog signal, can be made to readily trigger the circuit to produce an output pulse which is at a unique level of the input signal.

The main element of the present invention is a magnetic core which is characterized by its having a rectangular hysteresis characteristic with accompanying substantial residual flux characteristics which define the two stable states of the core. In accordance with the present invention, the magnetic core is biased into one of its stable states and is switched therefrom by an appropriate electronic switch on the input. An output circuit is provided which is regeneratively connected to the core to produce a substantially uniform output signal when the core is switched by an input signal overcoming the bias on the core.

It is accordingly another more specific object of the present invention to provide a new and improved pulse generator useful as a pulse discriminator and as a pulse amplifier.

Another more specific object of the present invention is to provide a new and improved apparatus which is useful as a highly sensitive pulse generator which will produce an output pulse when an input signal level has reached a predetermined value.

A still further more specific object of the invention is to provide a new and improved bistable magnetic core circuit utilizing a unique combination of electronic input switching circuitry and regenerative output circuitry to produce uniform output pulses from input signals of varying amplitude and duration.

2

The foregoing and other features of novelty which characterize the invention are pointed out with particularity in the claims annexed to and forming a part of the present specification. For a better understanding of the invention, its advantages, and specific objects attained with its use, reference should be had to the accompanying drawings and descriptive matter in which there is illustrated and described a preferred embodiment of the invention.

Figure 1:
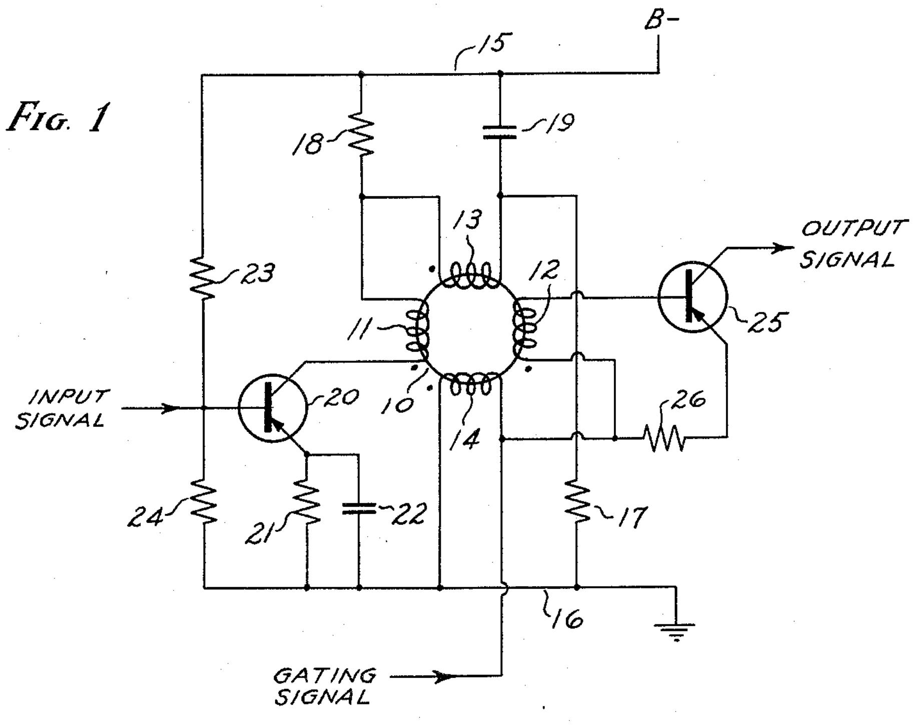
Figure 1 is a schematic showing of a preferred form of the invention.
Figure 2:
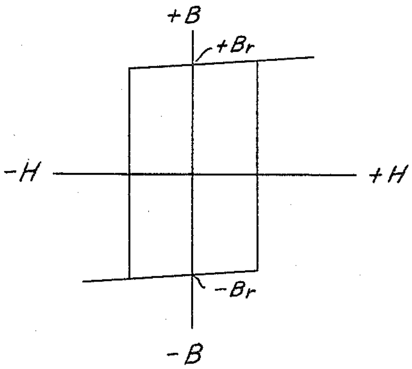
Figure 2 is a typical hysteresis characteristic for a magnetic core element.

Referring to the Figure 1, the numeral 10 represents a bistable magnetic core having a substantially square hysteresis characteristic with the two stable states thereof being defined by the two residual flux points on the hysteresis characteristic. The two points are illustrated at $+Br$ and $-Br$ on the B-H characteristic of the core 10 as illustrated in Figure 2. Wound on this core 10 are a plurality of input and output windings. The winding 11 is provided for use as an input winding, winding 12 is used as an output winding, winding 13 is used mainly as a bias winding, and winding 14 is used as a regenerative winding and also as a winding suitable for having a gating signal applied thereto.

Power is supplied to the circuitry by a B— lead 15 and a grounded lead 16. The biasing winding 13 on the core 10 receives its biasing signal by way of a resistor 17 which is connected to the ground lead 16 and a further resistor 18 which is connected to the B— lead 15. Also connected between the winding 13 and the B— lead 15 is a condenser 19.

The signal to the input winding 11 is controlled by a transistor 20 having the normal base, emitter, and collector electrodes. The winding 11 is connected in series with the emitter-collector circuit of the transistor and is also coupled at its upper terminal through the resistor 18 to the B— lead 15. The emitter circuit of the transistor 20 is connected by way of a resistor 21 to the ground lead 16. A condenser 22 is connected in parallel with the resistor 21. Connected to the base of the transistor 20 are a pair of resistors 23 and 24 which establish the biasing voltage for the base.

The windings 12 and 14 are associated with a further output transistor 25 also having the normal base, emitter, and collector electrodes. The winding 12 is connected in series with the base-emitter circuit of the transistor 25 by way of a resistor 26. Winding 14 is coupled in series with the emitter-collector circuit of the transistor 25. A load can be inserted between the collector electrode of the transistor 25 and the B— lead 15. The number of turns in the windings 12 and 14 are so selected that the voltage on the winding 12 will be greater than that on winding 14 when there is an output from the core 10.

In considering the operation of the circuit illustrated in the drawing, it is first assumed that power is available at power leads 15 and 16 and that a current is flowing through the biasing winding 13 by way of the resistor 17, winding 13 and resistor 18. The current flow through this biasing winding 13 is assumed to be of such a polarity to switch the core 10 to what may be defined as the "one" state. Under these conditions, without any input signal, the transistor 20 will be biased into its quiescent, very slightly or non-conducting, state so that there will be substantially very little or no current flowing through the input winding 11. The transistor 25 will be cut off, its base and emitter electrodes being at the same potential.

When an input signal is applied to the transistor 20 tending to increase the conductivity of the transistor, an input signal current will begin to flow in the input winding 11. As soon as the flux induced in the core 10 and the winding 11 exceeds that from the biasing winding 13, the core 10 will be switched to its opposite stable state which may be defined as the "zero" state. As soon as the core begins to switch, an output signal is generated in the output winding 12 and a negative signal is applied to the base of the transistor 25 so that the transistor 25 will begin to conduct. Due to the regenerative coupling through the winding 14, and increased switching signal will be applied to the transistor 25 between the base and emitter thereof to cause a sharp rise in the output current in the winding 14 and through the transistor 25 to a suitable output load device, not shown. After the core 10 has been switched to the "zero" state, the flux change in the core will cease and consequently the transistor 25 will return to its nonconductive state. There will be a relatively sharp cut-off effected upon the transistor 25 for the reason that after the core has been driven to saturation in the opposite direction, and the core comes back to its residual point in that saturation, there will be a cut-off signal generated in the winding 12 to quickly drop the conduction in the transistor to its cut-off state. As long as the input signal remains upon the winding 11, and this signal is sufficient to overcome the fixed bias applied to the core 10 by way of the winding 13, the core will remain switched in the "zero" state and no further pulses will be emitted no matter how strong and long the input signal may be.

When the input signal is removed from the transistor 20 so that the current flow through the transistor 20 drops below the value necessary to sustain the core 10 in its "zero" state, the bias winding 13 will switch the core 10 back into its "one" state. In switching in this opposite direction, the polarity of the output signal on the output windings 12 and 14 will be positive and thusly will not effect any current flow through the transistor 25, and consequently there will be no output signal from transistor 25 when the core is switched back to this opposite state.

The foregoing operation is considered with respect to a steady state output signal wherein once the magnitude of that signal has achieved a certain value, a single output pulse will be generated. It will be apparent that inasmuch as the core switches from one stable state to the opposite stable state that the flux change will be constant and consequently each of the output pulses produced by this switching will be uniform pulses regardless of the nature of the input signal once the core has received sufficient input signal to switch.

When an input pulse is applied to the transistor 20, it is likewise intended that the apparatus function to produce a uniform output pulse. In the case of a rapidly rising input pulse, the switching of the transistor 20 into its conductive region will drop the potential on the lower end of the resistor 18 so as to decrease the current flowing through the bias winding 13 and to further cause a current flow in the winding 11 tending to switch the core 10 to its opposite or "zero" state. The change in the potential at the lower end of the resistor 18 is reflected into the condenser 19 which will assume a charge in accordance with the potential drop. A switching of the core 10 will operate regeneratively on the transistor 25 and there will be produced an output signal pulse. After the input pulse has disappeared on the input of the transistor 20, the condenser 19 will tend to discharge through the winding 13 and further aid in switching the core back to its "one" state.

Another feature of the present invention is the ease with which the circuit may be gated to prevent any switching from taking place in the core 10. This is readily accomplished by applying a gating signal to the winding 14 during those times that it is desired to maintain the core inactive. This may be in the form of a steady state signal or it may be in the form of a pulse signal of sufficient duration to block out the effects of any input signal pulse that might be applied to the input of the transistor 20.

The gating is generally not done by applying the signal in the polarity which increases the bias to keep the core in the "one" state. To do so would require substantial power to neutralize strong input signals trying to switch the core to the "zero" state. The gating is done to reverse the bias and to purposely set the core permanently in the "zero" state. Then there can not be any output pulses no matter how large the input signal is because the core is already switched to the opposite "zero" state.

When the initial gating is effected by the use of a signal which switches the core 10 from a "one" to a "zero" state, the application of this gating signal must be at a time when the producing of an output pulse by the transistor 25 will be of no effect. Thereafter, when the gate signal is removed, the core 10 will switch back to the "one" state. An input signal may then be used to switch the core 10 to the "zero" state. The re-application of the gating signal, with the core in the "zero" state, will hold the core in that state.

It will be readily apparent that this particular circuit is well adapted to any type of circuit wherein a signal discrimination is required with respect to the input signals whether they be steady state signals or pulse signals. Thus, the circuit has usefulness in analog to digital conversion circuits as well as in digital discrimination and amplification circuits.

While, in accordance with the provisions of the statutes, there has been illustrated and described the best form of the invention known, it will be apparent to those skilled in the art that changes may be made in the form of the apparatus disclosed without departing from the spirit of the invention as set forth in the appended claims, and that in some cases, certain features of the invention may be used to advantage without a corresponding use of other features.

Having now described the invention, what is claimed is:

1. A pulse producing circuit comprising a bistable magnetic core, a first winding on said core, a direct current source of power connected to said winding and adapted to bias said core to one of its bistable states, an input winding on said core, said input winding being connected to an input signal source and, when energized, supplying a flux to said core tending to switch said core to the other of its bistable states, and an output circuit regeneratively coupled to said core to produce an output pulse when said core is being switched from said one state to said other state.

2. A pulse producing circuit comprising a bistable magnetic core, a first winding on said core, a direct current source of power connected to said winding and adapted to bias said core to one of its bistable states, an input winding on said core, an input signal source connected to said input winding and said first winding, said input winding and said first winding, when energized by said signal source, supplying a flux variation to said core tending to switch said core to the other of its bistable states, and an output circuit regeneratively coupled to said core to produce an output pulse when said core is being switched from said one state to said other state.

3. A pulse producing circuit comprising a bistable magnetic core, a first winding on said core, a direct current source of power connected to said first winding and adapted to bias said core to one of its bistable states, an input winding on said core, an input signal source comprising an electronic switch connected in series with said input winding and said first winding, said input winding, when energized, supplying a flux to said core tending to switch said core to the other of its bistable states, and an output circuit comprising a pair of output windings connected to an amplifying device and regeneratively coupled to said core to produce an output pulse when said core is being switched from said one state to said other state.

4. A pulse producing circuit comprising a bistable magnetic core, an input winding on said core, said input winding, when energized, tending to switch said core to one of its bistable states, a direct current source of power, a biasing winding on said core connected to said source of power and being adapted, when energized, to switch said core to the other of its bistable states, a further pair of windings on said core, and an amplifying device regeneratively connected to said further pair of windings and having an output terminal connected thereto, said amplifying device being operative to produce an output pulse when said core is being switched from said other bistable state to said one bistable state.

5. A pulse producing circuit comprising a bistable magnetic core, an input winding on said core, said input winding, when energized, tending to switch said core to one of its bistable states, a direct current source of power, a biasing winding on said core connected to said direct current source of power and being adapted, when energized, to switch said core to the other of its bistable states, a further pair of windings on said core and a transistor having its base-emitter circuit coupled to one of said pair of windings and its emitter-collector circuit connected to the other of said pair of windings, and having an output terminal connected thereto, said transistor being operative to produce an output pulse when said core is being switched from said other bistable state to said one bistable state.

6. A pulse producing circuit comprising a bistable magnetic core, an input winding on said core, said input winding, when energized, tending to switch said core to one of its bistable states, a direct current source of power, a biasing winding on said core connected to said direct current source of power and being adapted, when energized, to switch said core to the other of its bistable states, a further pair of windings on said core, an amplifying device regeneratively connected to said further pair of windings and having an output terminal connected thereto, said amplifying device being operative to produce an output pulse when said core is being switched from said other bistable state to said one bistable state, and a transistor switch connecting said source of power to said input winding to control the energization thereof.

7. Electrical apparatus comprising a bistable magnetic core, a pair of power supply terminals, a first winding on said core connected between said pair of power supply terminals to bias said core into one of its bistable states, said last named connection including a resistor, a condenser connected between the end of said first winding, opposite the end connected to said resistor, and the power supply terminal to which said resistor is connected, an input winding on said core, means connecting one end of said input winding to said resistor, a electronic switch connecting the other end of said input winding to one of said power supply terminals, said electronic switch when operative effecting a current flow to switch said core to the other of its bistable states, and an output winding on said core producing an output pulse when said core is being switched between said one to said other bistable state.

8. Electrical apparatus comprising a bistable magnetic core, a pair of power supply terminals, a first winding on said core connected between said pair of power supply terminals to bias said core into one of its bistable states, said last named connection including a series connected resistor, a condenser connected to a power supply terminal and to said resistor through said first winding, an input winding on said core, means connecting one end of said input winding to said resistor, an electronic switch connecting the other end of said input winding to one of said power supply terminals, said electronic switch when operative effecting a current flow to switch said core to the other of its bistable states, and an output winding on said core producing an output pulse when said core is being switched between said one to said other bistable state.

9. Electrical apparatus comprising a bistable magnetic core, a pair of power supply terminals, a first winding on said core connected between said pair of power supply terminals to bias said core into one of its bistable states, said last named connection including a series connected resistor, a condenser connected to a power supply terminal and to said resistor through said first winding, an input winding on said core, means connecting one end of said input winding to said resistor, an electronic switch connecting the other end of said input winding to one of said power supply terminals, said electronic switch, when operative, effecting a current flow to switch said core to the other of its bistable states, a pair of output windings on said core regeneratively coupled to an amplifying device, and a signal gating source connected to one of said pair of output windings.

10. Electrical apparatus comprising a bistable magnetic core, a pair of power supply terminals, a first winding on said core connected between said pair of power supply terminals to bias said core into one of its bistable states, said last named connection including a series connected resistor, a condenser connected to a power supply terminal and to said resistor through said first winding, an input winding on said core, means connecting one end of said input winding to said resistor, an electronic switch connecting the other end of said input winding to one of said power supply terminals, said electronic switch when operative effecting a current flow to switch said core to the other of its bistable states and to charge said condenser, said condenser when discharging passing current through said first winding tending to switch said core back to the state in which it is biased, and a pair of output windings on said core regeneratively coupled to an amplifying device.

11. Electrical apparatus comprising a bistable magnetic core, a pair of power supply terminals, a first winding on said core connected between said pair of power supply terminals to bias said core into one of its bistable states, said last named connection including a first resistor connected to one of the supply terminals and a second resistor, the latter being connected to the supply terminal opposite that of said first resistor, an input winding on said core, means connecting one end of said input winding to said first resistor, an electronic switch connecting the other end of said input winding to one of said power supply terminals, said electronic switch, when operative to pass a substantial current, effecting a current flow to switch said core to the other of its bistable states, and an output winding on said core producing an output pulse when said core is being switched between said one to said other bistable state.

References Cited in the file of this patent

UNITED STATES PATENTS

| | | |
|---|---|---|
| 2,747,110 | Jones | May 22, 1956 |
| 2,824,697 | Pittman et al. | Feb. 25, 1958 |
| 2,891,170 | Paull | June 16, 1959 |
| 2,913,708 | Paull | Nov. 17, 1959 |

OTHER REFERENCES

1955 IRE Convention Record, Part 4, pp. 84–94, March 21–24, 1955, "A Transistor-Magnetic Core Circuit; A New Device Applied to Digital Computing Technique" by S. S. Guterman and W. M. Carey, Jr.